(12) United States Patent
Peterson et al.

(10) Patent No.: US 9,496,739 B2
(45) Date of Patent: Nov. 15, 2016

(54) BALANCING DISCHARGE IN PARALLEL BATTERY CONFIGURATIONS

(71) Applicant: Electrochem Solutions, Inc., Clarence, NY (US)

(72) Inventors: Brian Robert Peterson, Norton, MA (US); Jon Carroll, Attleboro, MA (US); Arden Phillip Johnson, Arlington, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 1014 days.

(21) Appl. No.: 13/706,537

(22) Filed: Dec. 6, 2012

(65) Prior Publication Data

US 2013/0154567 A1    Jun. 20, 2013

Related U.S. Application Data

(60) Provisional application No. 61/576,533, filed on Dec. 16, 2011.

(51) Int. Cl.
  *H02J 7/00*    (2006.01)
(52) U.S. Cl.
  CPC ............ *H02J 7/0063* (2013.01); *H02J 7/0014* (2013.01); *H02J 2007/0067* (2013.01); *Y02T 10/7055* (2013.01)
(58) Field of Classification Search
  CPC .................................................... H02J 7/0063
  USPC ....... 320/112, 118, 126, 127, 128, 129, 135, 320/136
  See application file for complete search history.

(56) References Cited

U.S. PATENT DOCUMENTS

| | | | |
|---|---|---|---|
| 7,535,200 B2* | 5/2009 | Chang ............... | H01M 10/4207 320/118 |
| 7,728,553 B2* | 6/2010 | Carrier ............... | H01M 2/1022 320/116 |
| 8,026,698 B2 | 9/2011 | Scheucher | |
| 2005/0275373 A1 | 12/2005 | Guang et al. | |
| 2010/0305770 A1 | 12/2010 | Bhowmik et al. | |
| 2011/0057617 A1 | 3/2011 | Finberg et al. | |

* cited by examiner

*Primary Examiner* — Richard V Muralidar
(74) *Attorney, Agent, or Firm* — Kevin D. McCarthy; Michael F. Scalise

(57) ABSTRACT

An apparatus balances a discharge in parallel battery configuration by having a battery pack (a) with a first battery system and a second battery system in parallel configuration, and a pulse width modulation device and (b) being interconnectable to a load. Each of the first and second battery systems has, in series and in order, a first voltage sensor, a resistor, a second voltage sensor, a string of battery cells, and a switching device. The first and second voltage sensor, in each battery system, measures an electrical current, used to calculate the voltage drop across each resistor. The voltage drop values for each battery system determine whether the pulse width modulation device alters or maintains the pulse width modulation applied to each battery system's switching device. By maintaining or altering the pulse width modulation applied to each switching device, the apparatus effectively balances the electrical current discharge from each battery system.

17 Claims, 2 Drawing Sheets

BALANCING DISCHARGE IN PARALLEL BATTERY CONFIGURATIONS

CROSS-REFERENCE TO RELATED APPLICATIONS

This application claims priority to U.S. provisional patent application Ser. No. 61/576,533; filed on Dec. 16, 2011.

FIELD OF THE INVENTION

The present invention is directed to a battery pack configuration that properly balances the battery cell's discharge wherein the battery cells are in a parallel configuration and a method to perform the same.

BACKGROUND OF THE PRESENT INVENTION

It is very common in battery packs to connect together individual battery cells or strings of battery cells (two or more battery cells in a series configuration wherein the discharge battery and receiving battery are in series and the other, optional batteries in the string of battery cells can be in a series, parallel or combination thereof configuration) in a parallel configuration. Such a parallel configuration makes it possible to obtain higher current or power from the battery pack than would be available from just a single cell or series of cells. When cell strings are connected in parallel, it is possible the different strings could discharge at different rates. Unequal discharge rates can occur, for example, if the electrical connections to one string have higher resistance than the electrical connections to another string or other strings. Another possible cause of unequal discharge rates is the situation in which one (or more) of the cells in one of the strings has higher internal impedance than the other cells. Any situation in which, cell strings that are connected in parallel and discharge at unequal rates can potentially lead to hazardous conditions. A cell in a string that is discharged at a higher rate will reach its end of life more rapidly than cells in other strings that have a lower discharge rate. As a result there can be a risk that those higher discharge rate cells will be (a) discharged deeply or (b) driven into reversal, which can lead to dangerous behavior such as cell venting.

One particularly common situation in which there is notable risk of unequal discharge rates is that presented by very large packs in which it is difficult to maintain an even temperature throughout the pack. If heat is generated in the cells during the discharge, then cell strings that are located in the interior of the pack and which are thus subjected to additional heating from adjacent packs will be warmer than similar cell strings located toward the outside (a.k.a., perimeter) of the pack. Because internal impedance in batteries tends to decrease at higher temperatures, the cell strings that are warmer will have lower impedance and will thus deliver higher current than the cooler strings. Methods exist for controlling the temperature within a battery pack so that the temperature is the same throughout the pack. However, those cooling methods are costly in (a) regard to reduced energy efficiency and increased weight and (b) materials.

Applicant is aware of US published application numbers 2005/0275373 to Huang et al.; 2010/0305770 to Bhowmik et al.; and 2011/0057617 to Finberg et al.; and U.S. Pat. No. 8,026,698 to Scheucher. These references disclose battery packs. Some of those battery packs have a string of battery cells in parallel configurations, switching devices controlled by pulse width modulators, or sensors that measure current or voltages and, as a result of those measurements, the switching devices are turned on or off by the pulse width modulators.

The above-identified references do not disclose two sensors sandwiching an intermediate sense resistor and placed in series with each string of battery cells, in particular in series with the most negative cell in each string of battery cells. There are at least a first string of battery cells and a second/more string of battery cells wherein every string of battery cells are in a parallel configuration. For example, the sensors measure the current being drawn by each string of battery cells and based on the reading of the first string of battery cells and the readings from the other string(s) of battery cells, the duty cycle on the first string of battery cell's pulse width modulator (PWM) switching device adjusts or maintains the current to match the current of the other string(s) of battery cells.

Overall, it would be preferable to use a lighter, less bulky, or less expensive method for balancing the rate of discharge in the separate cell strings that are connected in parallel in a battery pack. The apparatus and method set forth in this application would preferably maintain the same rate of discharge in the separate strings regardless of any temperature differences between the strings.

SUMMARY OF THE INVENTION

An apparatus balances a discharge in parallel battery configuration by having a battery pack (a) with a first battery system and a second battery system in parallel configuration, and a pulse width modulation device and (b) that is interconnectable to a load. Each of the first and second battery systems has, in series and in order, a first voltage sensor, a resistor, a second voltage sensor, a string of battery cells, and a switching device. The first and second voltage sensor, in each battery system, measures an electrical current that is used to calculate the voltage drop across each resistor. The voltage drop values for each battery system determine whether the pulse width modulation device alters or maintains the pulse width modulation applied to each battery system's switching device. By maintaining or altering the pulse width modulation applied to each switching device, the apparatus effectively balances the electrical current discharge from each battery system.

DETAILED DESCRIPTION OF THE PRESENT INVENTION

Battery packs 10 having assemblies of battery cells in parallel and series configurations are widely used as power sources in devices and applications for which a fixed source of electrical power, such as the electrical power grid, is not available, or where connection to the power grid is not practical. Examples include devices that are deployed in remote locations, such as space satellites or oceanic buoys. Other examples include devices that move and where the power source must therefore be contained in the device;

such devices include, for example, electric vehicles, and untethered electronic equipment for measurement and communication.

Figure 1:
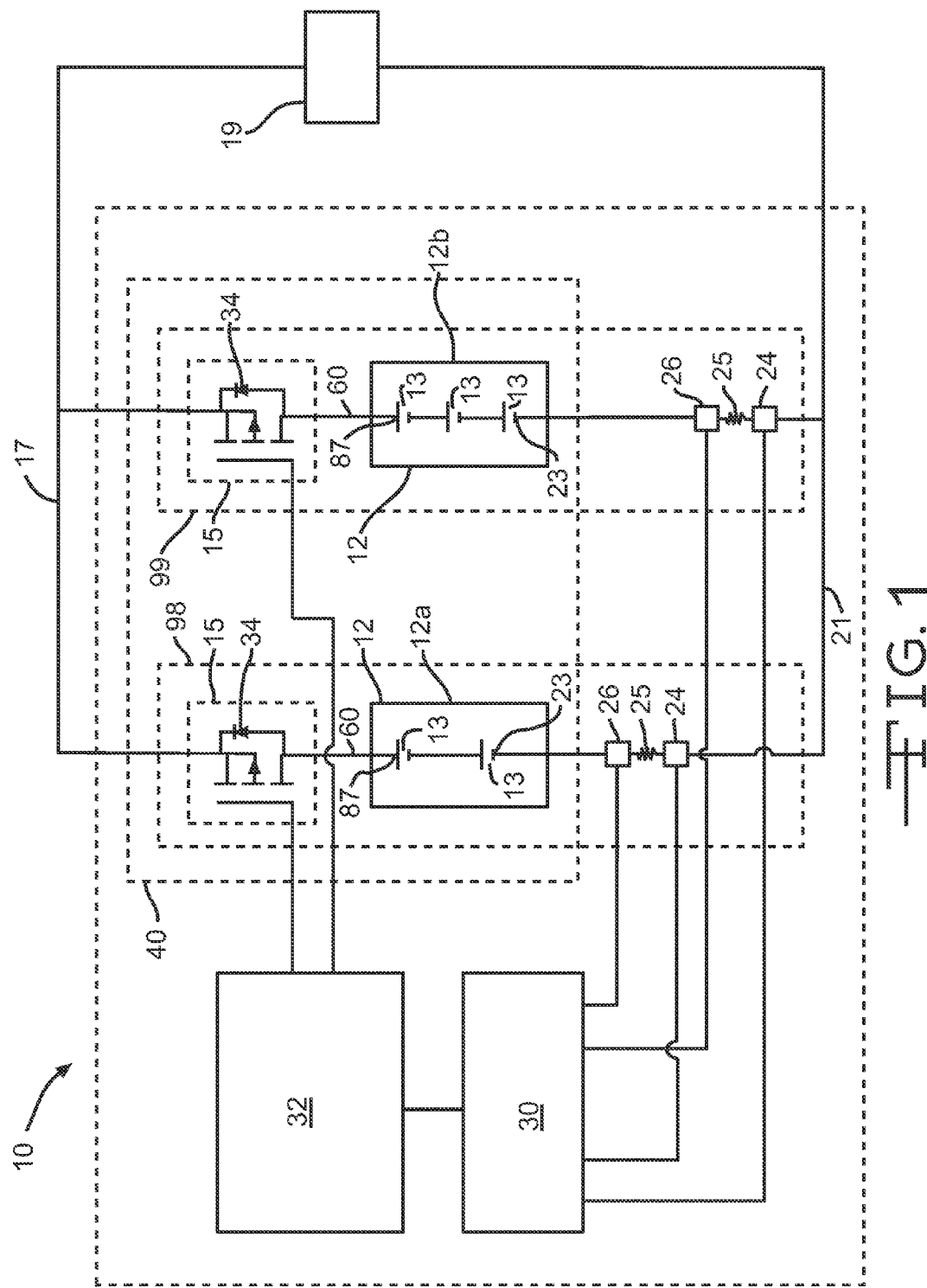
FIG. 1 illustrates an electrical schematic of the present invention.

As illustrated at FIG. 1, the current invention is directed to the battery pack 10. The battery pack 10 has at least a first battery system 98 and a second battery system 99 that are in parallel configurations.

Figure 3:
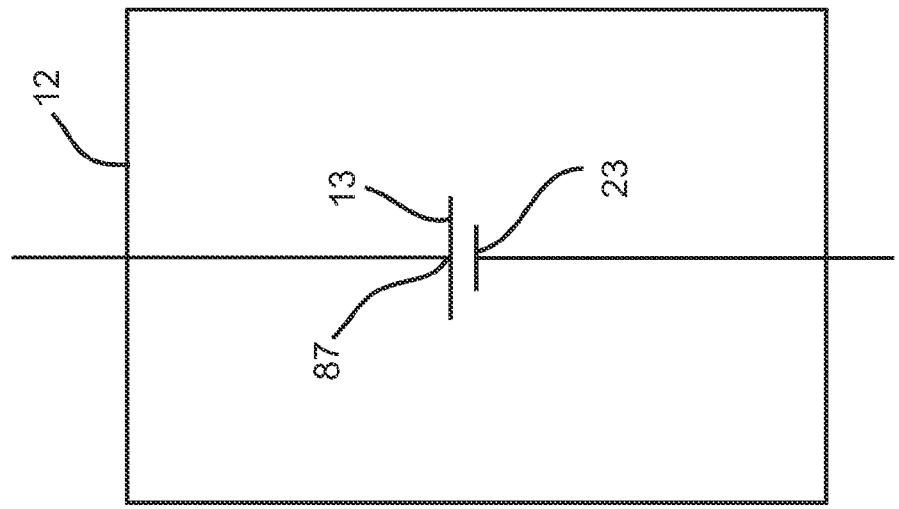
FIG. 3 illustrates a second alternative embodiment of the string of battery cells that can be used in FIG. 1.
Figure 2:
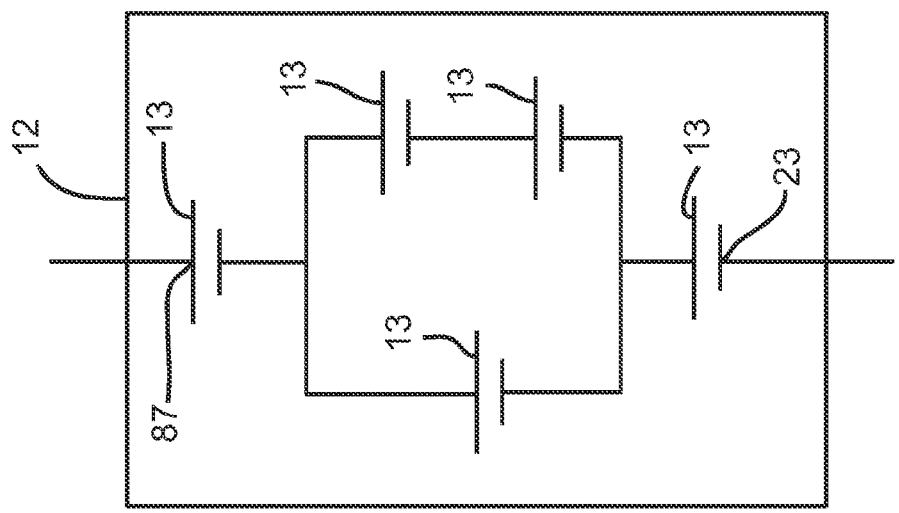
FIG. 2 illustrates an alternative embodiment of the string of battery cells that can be used in FIG. 1.

Each battery system 98, 99 has, in series and in order, a first sensor 24, a resistor 25, a second sensor 26, a string of battery cells 12, and a switching device 15. For convenience, the first battery system 98 has the string of battery cells 12 referred to as a first string of battery cells 12a, and the second battery system 99 has the string of battery cells referred to as a second string of battery cells 12b. At least one of the strings of battery cells 12a, 12b has at least two individual battery cells 13 in (a) a series configuration as illustrated at FIG. 1; and (b) a dominant series configuration as illustrated at FIG. 2; and in some embodiments, the other string of battery cells 12 can be a single battery cell 13 as illustrated in FIG. 3. FIGS. 1, 2 and 3 illustrate strings of battery cells having 1, 2, 3, and 5 battery cells 13. It should be understood that, if desired, the number of battery cells 13 in each string of battery cells 12 can be any number so long as at least one string of battery cells 12 has two or more battery cells 13. Each individual battery cell 13 provides the same current or voltage; or different current or voltage.

Returning to FIG. 1, the electrical current discharged from each string of battery cells 12—the discharge battery 87—is directed, through an electrical conduit 60, to the switching device 15 that is, as previously indicated, in parallel with a corresponding string of battery cells 12. When the switching device 15 is closed, the electrical current is discharged from the respective battery system 98, 99, through an electrical load bus 17, to a load 19. The electrical current passes through the load 19 to an electrical returning bus 21. The electrical current leaves the returning bus 21 to revert to each battery system 98, 99.

Prior to entering the most negative cell or the receiving battery cell 23 in each string of battery cells 12, the electrical current passes through the first voltage sensor 24, the resistor 25, and the second voltage sensor 26. The resistor 25 is a small value resistor. A small value resistor can be 5 ohms or less (not zero), preferably 100 m ohms or less (not zero), and most preferably 10 m ohms or less (not zero).

The first voltage sensor 24 measures the electrical current's voltage prior to the electrical current passing through the resistor 25 while the second voltage sensor 26 measures the electrical current's voltage after the electrical current passed through the resistor 25. Those respective voltage measurements from the first and second voltage sensors for each battery system 98, 99 are transmitted to a computer processing unit 30. The computer processing unit 30 calculates the voltage drop for each respective string of battery cells 12.

Based on those voltage drop calculations, the computer processing unit 30 transmits a signal to a pulse width modulation device (PWM) 32—the computer processing unit 30 and the pulse width modulation device 32 can be the same device or different devices as shown in FIG. 1 for illustration purposes. Based on that signal, the pulse width modulation device 32 alters or maintains the pulse width modulation in each switching device 15 to effectively balance the electrical current discharge from the strings of battery cells 12.

In order to control cell balancing between cell strings on discharge, the current output from each string is matched. This is accomplished so that all strings 12 (12a, 12b) discharge around the same amount and, preferably, at the same amount. The way this is done is through pulse width modulation that is accomplished through the pulse width modulator (PWM) 32. By adjusting the PWM's 32 duty cycle (time on versus total waveform time) the average output voltage changes, which is the voltage that the load receives. As previously alluded to, the switching device 15 (which can be a series transistor) is switched on and off at a fixed frequency and its duty cycle is adjusted in order to control the voltage seen by an OR-ing circuit 40—battery pack 10 with multiple cell strings is essentially the or-ing circuit 40.

By utilizing pulse width modulation through the PMW 32, that same principal can be applied to adjust the cell strings 12 output and thus change the cell string's 12 loading. By reducing the voltage of one string 12a, the load on that string can be or is reduced while increasing the load on the other strings 12b et al.

By altering the duty cycle by a small amount, the output voltage only changes slightly to allow for minor adjustments. Those adjustments keep the overall balancing scheme stable and eliminate the risk of over-loading a cell string 12.

Pulse width modulation through the PMW 32 is a method for switching on and off an in-series transistor (switching device) 15, such as a FET, at a specific frequency. One example of a frequency could be 500 kHz or 500,000 times a second. An example of a duty cycle adjustment occurs if a 10V supply's output had a pulse width modulation output, that output voltage can be reduced to 5V by running the pulse width modulation, through the PMW 32, scheme at a 50% duty cycle.

The battery pack 10 with multiple cell strings is essentially an or-ing circuit 40 (the higher voltage string wins) as each string 12 (12a, 12b) has a series blocking diode 34, as illustrated in the switching device 15 or which is positioned after the switching device 15, to block accidental charging between the cell strings 12a, 12b. As the highest voltage string(s) is loaded, the voltage drops at a rate depending on the load current. As its voltage drops, the other strings begin to become loaded and thus voltages reduce. In a perfect world, the cells are at identical voltages and as a result all loaded equally. As known by those having ordinary skill in the art, however, a system where individual cells are at identical voltage is difficult to achieve. There are many reasons. One is that the series resistance of the cell string 12 (12a, 12b) might be slightly different.

In other words, the PWM device 32 transmits a distinct signal to each switching device 15 in each battery system 98, 99 that alters or maintains the pulse width modulation applied to each switching device 15 in each battery system 98, 99. Those distinct signals can (a) maintain the pulse width modulation applied to each switching device; (b) alter the pulse width modulation applied to each switching device; (c) maintain the pulse width modulation applied to the switching device in the first battery system 12a and alter the pulse width modulation applied to the switching device in the second battery system 12b; or (d) maintain the pulse width modulation applied to the switching device in the second battery system 12b and alter the pulse width modulation applied to the switching device in the first battery system 12a.

Pulse width modulation through the PMW 32 controls the loading by adjusting the voltage seen by that or-ing circuit 40 and thus changes the loading. Pulse width modulation can reduce one string, for example string 12a, and load other strings, for example string 12b. Controlling the pulse width modulation occurs through the computer processing unit 30, which can be a micro computer unit like a PIC Microcontroller, which works through algorithms to balance the load on the cell strings 12.

By measuring the voltage drop across the individual resistors 25, the computer processing unit 30 accurately determines the current drawn in each string 12a, 12b by using Ohm's Law to solve for current, since the V and the R are known.

As previously disclosed, the sense resistor 25 is in series with the most negative end of each string. The resistor 25, and the sensors 24, 26 for each cell string 12 in combination with the computer processing unit 30, measures the current being drawn by each cell string 12a, 12b. Based on the readings from each cell string 12 (12a, 12b), the duty cycle on each pulse width modulating switching device adjusts the current to match the other string's output.

It is, therefore, apparent that an apparatus configuration to properly balance the discharge in parallel battery configurations and a method to perform the same is disclosed in this specification. While this invention has been described in conjunction with preferred embodiments thereof, it is evident that many alternatives, modifications, and variations will be apparent to those skilled in the art. Accordingly, the present invention is intended to embrace all such alternatives, modifications and variations that fall within the broad scope of the appended claims.

The invention claimed is:

1. An apparatus configured to balance a discharge in a parallel battery configuration, the apparatus comprising:
    a battery pack (a) having a first battery system and a second battery system in a parallel configuration, a pulse width modulation device, and a computer processing unit, and (b) being connectable to a load;
    the first battery system and the second battery system each having, in series and in order, a string of battery cells that generate an electrical current, a first voltage sensor, a resistor, a second voltage sensor, and a switching device;
    wherein the first voltage sensor, in each battery system, measures the electrical current's voltage from the string of battery cells prior to the electrical current passing into the resistor, and wherein the second voltage sensor measures the electrical current's voltage coming from the resistor;
    wherein the first and second voltage measurements from the first and second voltage sensors in each battery system are transmittable to the computer processing unit;
    the computer processing unit being configured to calculate a voltage drop across the resistor for each battery system; and
    based on the voltage drop calculation for each battery system, the computer processing unit is configured to transmit a signal to the pulse width modulation device; and
    the pulse width modulation device: (A) in response to the computer processing unit's transmitted signal, and (B) in order for the current in the first battery system and the current in the second battery to match each other to provide power to the load, transmits a first distinct signal to the first battery system's switching device and a second distinct signal to the second battery system's switching device;
    wherein the first and second distinct signals from the pulse width modulation device:
    a) maintain the first and second battery system's switching devices in an unaltered closed state; or
    (b) maintain one of the first and second battery systems' switching device in an unaltered closed state, but alter the other of the first and second battery systems' switching device from a closed to an open state to thereby balance the electrical current discharge from the first and second battery systems with the apparatus connected to the load and at least one of the switching devices in a closed state configured to power the load.

2. The apparatus of claim 1 wherein at least one of the string of battery cells has at least two individual battery cells in series configuration.

3. The apparatus of claim 1 wherein the electrical current is transmitted to the load only when the switching device is closed and the battery pack is connected to the load.

4. The apparatus of claim 1 wherein the pulse width modulation device and the computer processing unit are a single device.

5. The apparatus of claim 1 wherein at least one of the string of battery cells has a discharge battery cell and a battery cell configured to receive the electrical current in series configuration.

6. The apparatus of claim 5 wherein positioned between the discharge battery cell and the receiving battery cell is at least one battery cell in series with the discharge battery cell and the receiving battery cell.

7. The apparatus of claim 5 wherein positioned between the discharge battery cell and the receiving battery cell is at least two battery cells in parallel with the discharge battery cell and the receiving battery cell.

8. The apparatus of claim 1 wherein the switching device is a field effect transistor.

9. The apparatus of claim 1 wherein the resistor is 5 ohms or less, but greater than zero.

10. An apparatus configured to balance a discharge in a parallel battery configuration, the apparatus comprising:
    a battery pack (a) having a first battery system and a second battery system in a parallel configuration, a pulse width modulation device, and a computer processing unit, and (b) being connectable to a load;
    the first battery system and the second battery system each having, in series and in order, a string of battery cells that generate an electrical current, a first voltage sensor, a resistor, a second voltage sensor, and a switching device;
    wherein the first voltage sensor, in each battery system, measures the electrical current's voltage from the string of battery cells prior to the electrical current passing into the resistor, and wherein the second voltage sensor measures the electrical current's voltage coming from the resistor;
    wherein the first and second voltage measurements from the first and second voltage sensors in each battery system are transmittable to the computer processing unit;
    the computer processing unit being configured to calculate a voltage drop across the resistor for each battery system; and
    based on the voltage drop calculation for each battery system, the computer processing unit is configured to transmit a signal to the pulse width modulation device;
    the pulse width modulation device: (A) in response to the computer processing unit's transmitted signal, and (B) in order for the current in the first battery system and the current in the second battery to match each other to provide power to the load, transmits a first distinct signal to the first battery system's switching device and a second distinct signal to the second battery system's switching device;

wherein the first and second distinct signals from the pulse width modulation device:
(a) maintain the first and second battery system's switching devices in an unaltered closed state; or
(b) maintain one of the first and second battery systems' switching device in an unaltered open or closed state, but alter the other of the first and second battery systems' switching device from a closed to an open state to thereby balance the electrical current discharge from the first and second battery systems with the apparatus connected to the load and at least one of the switching devices in a closed state configured to power the load; and wherein the apparatus is not connected to any other battery source.

11. The apparatus of claim 10 wherein at least one of the string of battery cells has at least two individual battery cells in series configuration.

12. The apparatus of claim 10 wherein the electrical current is transmitted to the load only when the switching device is closed and the battery pack is connected to the load.

13. The apparatus of claim 10 wherein the pulse width modulation device and the computer processing unit are a single device.

14. The apparatus of claim 10 wherein at least one of the string of battery cells has a discharge battery cell and a battery cell configured to receive the electrical current in series configuration.

15. The apparatus of claim 14 wherein positioned between the discharge battery cell and the receiving battery cell is at least one battery cell in series with the discharge battery cell and the receiving battery cell.

16. The apparatus of claim 14 wherein positioned between the discharge battery cell and the receiving battery cell is at least two battery cells in parallel with the discharge battery cell and the receiving battery cell.

17. The method of using an apparatus, not connected to any other battery source, to balance a discharge in a parallel battery configuration, the method comprising the steps of:
providing an apparatus comprising:
a battery pack (a) having a first battery system and a second battery system in a parallel configuration, a pulse width modulation device, and a computer processing unit and (b) being connectable to a load;
the first battery system and the second battery system each having, in series and in order, a string of battery cells that generate an electrical current, a first voltage sensor, a resistor, a second voltage sensor, and a switching device;
connecting the battery pack to a load;
measuring from the first voltage sensor in each battery system, the electrical current's voltage from the battery string prior to the electrical current passing from the resistor to the second voltage sensor; and
measuring from the second voltage sensor in each battery system, the electrical current's voltage coming from the resistor;
calculating, for each battery system, the voltage drop across the resistor based on the first and second voltage measurements from the respective first and second voltage sensors;
transmitting, in response to the calculated voltage drop for each battery system, a voltage drop signal to the pulse width modulation device; and
transmitting, from the pulse width modulation device, a first distinct signal to the first battery system's switching device and a second distinct signal to the second battery system's switching device so that:
(A) in response to the voltage drop signal, and
(B) in order for the current in the first and second battery systems to match each other to continue powering the load, the pulse width modulation device
(i) maintains the first and second battery system's switching devices in an unaltered open or closed state; or
(ii) maintains one of the first and second battery systems' switching device in an unaltered open or closed state, but alters the other of the first and second battery systems' switching device from an open to a closed state or from a closed to an open state to thereby balance the electrical current discharging from the first and second battery systems while at least one of the switching devices is in a closed state with the apparatus powering the load.

* * * * *